United States Patent
Gibbons et al.

(10) Patent No.: US 11,960,546 B2
(45) Date of Patent: Apr. 16, 2024

(54) SUMMARIZATION OF AMBIGUOUS STRINGS

(71) Applicant: International Business Machines Corporation, Armonk, NY (US)

(72) Inventors: Adam John Gibbons, Sutton (GB); Seumas McLean Goddard, Winchester (GB); Shivani Joshi, Southampton (GB); James Kirk, Eastleigh (GB); Daphne Coates, Tonbridge (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/805,035

(22) Filed: Jun. 2, 2022

(65) Prior Publication Data

US 2023/0394087 A1    Dec. 7, 2023

(51) Int. Cl.
G06F 16/903    (2019.01)
G06F 16/9035    (2019.01)
H04L 51/216    (2022.01)
H04L 51/224    (2022.01)

(52) U.S. Cl.
CPC .... *G06F 16/90344* (2019.01); *G06F 16/9035* (2019.01); *H04L 51/216* (2022.05); *H04L 51/224* (2022.05)

(58) Field of Classification Search
None
See application file for complete search history.

(56) References Cited

U.S. PATENT DOCUMENTS

| | | | |
|---|---|---|---|
| 10,553,209 B2 | 2/2020 | Gruber | |
| 2008/0305815 A1* | 12/2008 | McDonough | H04M 3/493 455/466 |
| 2009/0070099 A1* | 3/2009 | Anisimovich | G06F 40/284 704/5 |
| 2012/0166180 A1 | 6/2012 | Au | |
| 2016/0147387 A1* | 5/2016 | Rahman | G06F 40/258 715/752 |
| 2017/0099592 A1 | 4/2017 | Loeb | |
| 2019/0386937 A1* | 12/2019 | Kim | G06F 40/117 |
| 2020/0073939 A1* | 3/2020 | Levchenko | G06N 3/126 |
| 2020/0367026 A1 | 11/2020 | Wu | |
| 2021/0286951 A1* | 9/2021 | Song | G06N 3/0454 |

(Continued)

FOREIGN PATENT DOCUMENTS

CN    110543269 B    4/2021

OTHER PUBLICATIONS

"ReplaceEmoji: Replacing Emoji with Text or Unicode", GitHub, downloaded from the Internet on Jan. 11, 2022, 3 pages, <https://rdrr.io/github/gesiscss/WhatsR/man/ReplaceEmoji.html>.

(Continued)

*Primary Examiner* — Chris Parry
*Assistant Examiner* — Abderrahmen Chouat
(74) *Attorney, Agent, or Firm* — Joseph P. Curcuru

(57) ABSTRACT

A processor may analyze one or more unread messages. The one or more unread messages may be from one or more respective conversations. The processor may generate, from the analyzing, an ambiguous strings model. The processor may summarize, via utilization of the ambiguous strings model, the one or more unread messages. The processor may genericize the ambiguous strings model.

20 Claims, 6 Drawing Sheets

(56) References Cited

U.S. PATENT DOCUMENTS

2022/0414132 A1* 12/2022 Chandrashekar ..... G06F 16/345

OTHER PUBLICATIONS

Bai et al., "A Systematic Review of Emoji: Current Research and Future Perspectives", Frontiers in Psychology, Oct. 15, 2019, 16 pages, <https://doi.org/10.3389/fpsyg.2019.02221>.
Barbieri et al., "What does this emoji mean? A vector space skip-gram model for twitter emojis", Published version 2016, pp. 3967-3972.
Hayati et al., "Analyzing Incorporation of Emotion in Emoji Prediction", Proceedings of the 10th Workshop on Computational Approaches to Subjectivity, Sentiment and Social Media Analysis, Jun. 6, 2019, Minneapolis, pp. 91-99.
Mehrotra et al., "My Phone and Me: Understanding People's Receptivity to Mobile Notifications", CHI'16, May 7-12, 2016, San Jose, CA, USA, pp. 1021-1032.
Mell et al., "The NIST Definition of Cloud Computing", National Institute of Standards and Technology, Special Publication 800-145, Sep. 2011, 7 pages.
Navigli, Roberto, "Word Sense Disambiguation: A Survey", ACM Computing Surveys, vol. 41, No. 2, Article 10, Publication date: Feb. 2009, 69 pages, <http://doi.acm.org/10.1145/ 1459352. 1459355>.
Novak et al., "Sentiment of Emojis", PLOS One, Published: Dec. 7, 2015, 22 pages, <https://doi.org/10.1371/ journal.pone.0144296>.
Santilli et al., "SyntNN at SemEval-2018 Task 2: is Syntax Useful for Emoji Prediction? Embedding Syntactic Trees in Multi Layer Perceptrons", Proceedings of the 12th International Workshop on Semantic Evaluation (SemEval-2018), Jun. 5-6, 2018, New Orleans, Louisiana, pp. 477-481.
Tomihira et al., "Multilingual emoji prediction using BERT for sentiment analysis", International Journal of Web Information Systems, vol. 16, No. 3, 2020, pp. 265-280, DOI 10.1108/IJWIS-09-2019-0042.
Wijeratne et al., "A Semantics-Based Measure of Emoji Similarity", arXiv:1707.04653v1 [cs.CL] Jul. 14, 2017, 18 pages.
Wu et al., "Disambiguating Dynamic Sentiment Ambiguous Adjectives", Proceedings of the 23rd International Conference on Computational Linguistics (Coling 2010), Beijing, Aug. 2010, pp. 1191-1199.

* cited by examiner

SUMMARIZATION OF AMBIGUOUS STRINGS

BACKGROUND

The present disclosure relates generally to the field of natural language processing, and more specifically to summarization of ambiguous text strings.

Users are currently able to receive notifications for instant messages for various platforms, which show a short preview of the message content, and which help users recognize the topic of a message before opening it. When receiving multiple instant messages or one long message in a 1:1 conversation, however, the user will receive either multiple notifications or just a one-line preview of a single message with an icon to indicate there is more.

SUMMARY

Embodiments of the present disclosure include a method, computer program product, and system for summarization of ambiguous strings. A processor may analyze one or more unread messages. The one or more unread messages may be from one or more respective conversations. The processor may generate, from the analyzing, an ambiguous strings model. The processor may summarize, via utilization of the ambiguous strings model, the one or more unread messages. The processor may genericize the ambiguous strings model.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
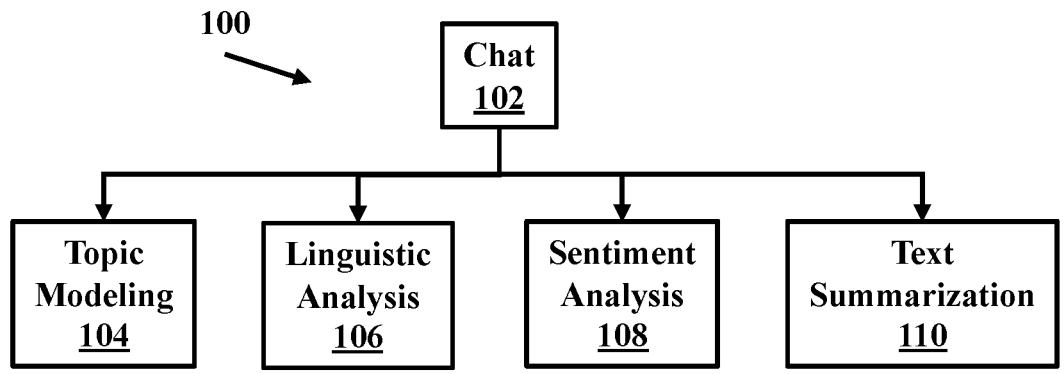
FIG. 1A illustrates a block diagram of an example system for analyzing unread messages, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of natural language processing, and more specifically to summarization of ambiguous text strings. While the present disclosure is not necessarily limited to such applications, various aspects of the disclosure may be appreciated through a discussion of various examples using this context.

Users are currently able to receive notifications for instant messages for platforms such as WhatsApp®, Facebook® Messenger and Instagram®, which show a short preview of the message content in order to help users to recognize the topic of a message before opening it. The issue with this method is that when receiving multiple instant messages or one long message in a 1:1 conversation, the user will receive either multiple notifications or just a one-line preview of a single message with an icon to indicate there is more. This can be a hinderance on many fronts such as notification clutter, or work prioritization.

With these issues in mind, a solution is needed to summarize (unread) messages/chats so that the receiver/user can easily act on information. However, this introduces a further challenge when attempting to summarize messages that contain emojis, abbreviations, and acronyms that can carry substantial meaning, but also change in meaning depending upon the context and sentiment of surrounding messages.

Accordingly, described herein is such a solution, in which: (1) unread messages in each conversation are analyzed; (2) the methods used in the analysis from step one allow a Social Meaning Extraction for Summarization of Ambiguous Strings (SMESAS) model (e.g., sometimes referred to herein as an ambiguous strings model) to be derived; (3) the ambiguous strings model is used to summarize unread messages in a conversation by creating a single, short message accounting for ambiguous text; and (4) the ambiguous strings model and processing may be generalized/genericized for other text sources. In order to help understanding, the FIGS. will now be discussed in detail.

Referring now to FIG. 1A, illustrated is a block diagram of an example system 100 for analyzing unread messages, in accordance with aspects of the present disclosure. In some embodiments, the depiction within FIG. 1A may be associated with step (1) described above. As depicted, the system 100 includes a chat 102, which may be made up of one or more messages (not depicted) that are either unread or read by a user, topic modeling 104, linguistic analysis 106, sentiment analysis 108, and text summarization 110.

In some embodiments, unread messages in the chat 102 are analyzed by:

The topic modeling 104, which is for separating and grouping potentially non-sequential messages based upon their content;

The linguistic analysis 106, which is for combining the sentiment analysis 108 with a dictionary lookup (not depicted or which could be a part of the text summarization 110) in order to have a 1:1 mapping of words/definition as opposed to 1:many mapping of words/definitions;

The sentiment analysis 108, which is for identifying underlying emotion and intent of a messages within/associated with the chat 102; and The text summarization 110, which is for shortening results to an acceptable length for notifications and easy user consumption.

In some embodiments, the analyzation of the chat 102 allow the system 100 to generate an ambiguous strings model which can be used by any, or all, of the systems depicted in FIGS. 1A-D. The ambiguous strings model can be used to generate summaries and/or notifications based on unread messages or for messages that contain unconventional characters (e.g., emojis, symbols, etc.) that could be hard to interpret.

It is noted that the chat 102 is used for ease of understanding but any or each conversation within a platform could be analyzed. It is further noted that the dictionary lookup that is discussed may be for replacing text and/or symbols with other pre-determined text (e.g., the numeral 2 may be changed to the word two, the symbol $ could be transformed into the word dollar, etc.).

Figure 1B:
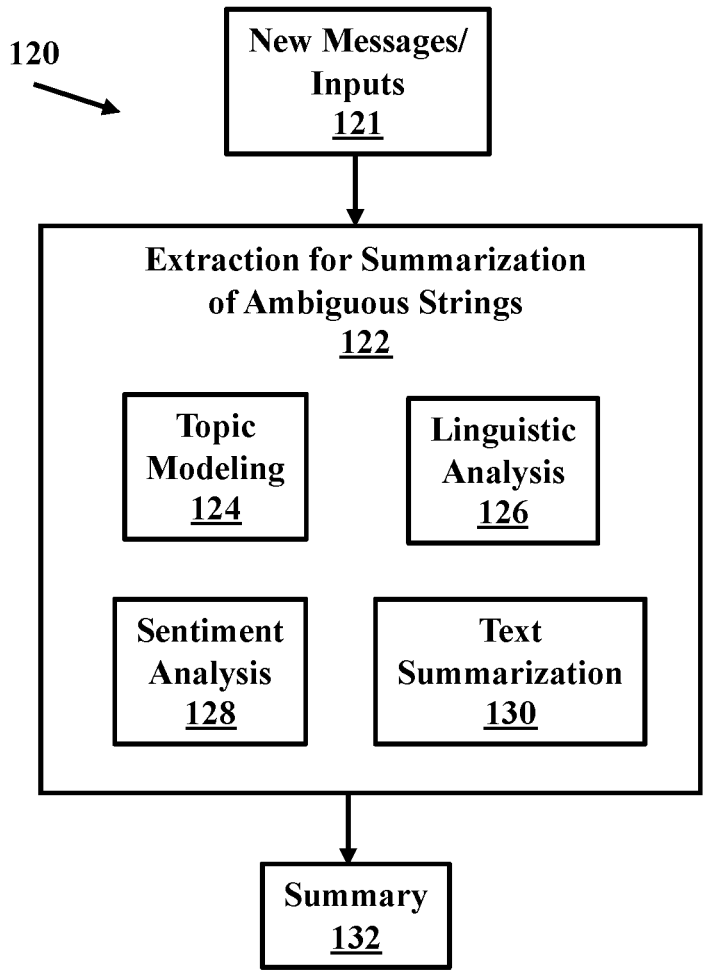
FIG. 1B illustrates a block diagram of an example system for deriving an ambiguous strings model, in accordance with aspects of the present disclosure.

Referring now to FIG. 1B, illustrated is a block diagram of an example system 120 for deriving an ambiguous strings model, in accordance with aspects of the present disclosure. In some embodiments, the depiction within FIG. 1B may be associated with step (2) described above. As depicted, the system 120 includes new messages/inputs 121 (which may be associated with the chat 102 of FIG. 1A), an extraction for summarization of ambiguous strings 122, and a summary 132.

In some embodiments, the extraction for summarization of ambiguous strings 122 includes topic modeling 124, linguistic analysis 126, sentiment analysis 128, and text summarization 130. In some embodiments, the topic modeling 124, the linguistic analysis 126, the sentiment analysis 128, and the text summarization 130 may be the same or substantially similar to the topic modeling 104, the linguistic analysis 106, the sentiment analysis 108, and/or the text summarization 110 of FIG. 1A.

In some embodiments, from the combination of analyses provided by the topic modeling 124, the linguistic analysis 126, the sentiment analysis 128, and/or the text summarization 130 the summary 132 may be derived. In some embodiments, the extraction for summarization of ambiguous strings 122 utilizes the combination of prior analyses to provide insight to a context/sentiment/etc. of the new messages/inputs 121.

Figure 1C:
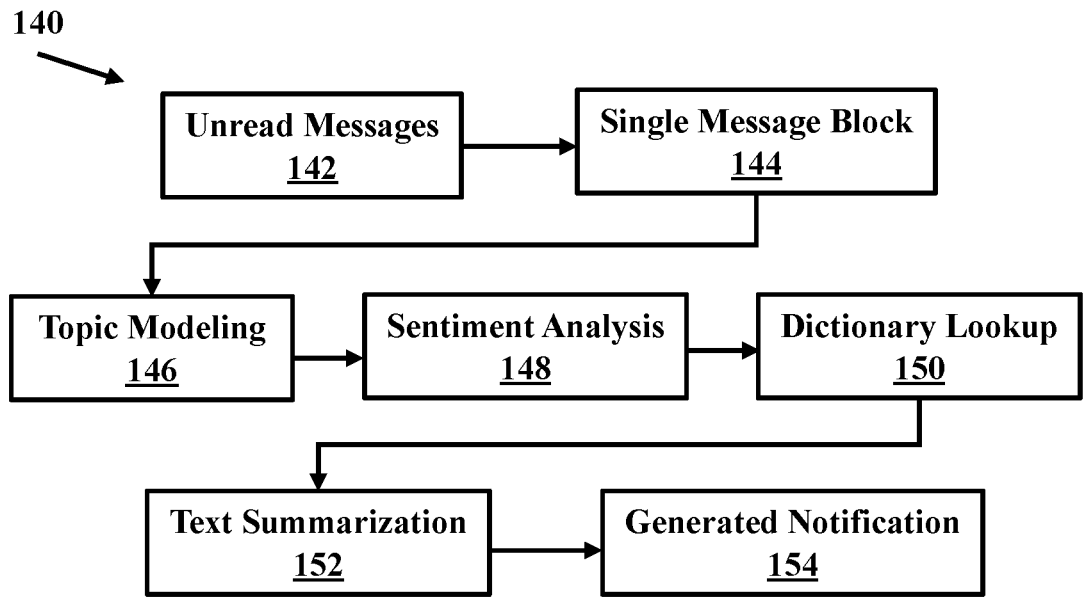
FIG. 1C illustrates a block diagram of an example system for notification generation, in accordance with aspects of the present disclosure.

Referring now to FIG. 1C, illustrated is a block diagram of an example system 140 for notification generation, in accordance with aspects of the present disclosure. In some embodiments, the depiction within FIG. 1C may be associated with step (3) described above. As depicted, the system 140 includes unread messages 142 (which may be the same or substantially similar to the chat 102 of FIG. 1A and/or the new messages/inputs 121 of FIG. 1B), a single message block 144, topic modeling 146 (which may be the same as or substantially similar to topic modeling 104 of FIG. 1A or topic modeling 124 of FIG. 1B), sentiment analysis 148 (which may be the same as or substantially similar to sentiment analysis 108 of FIG. 1A or sentiment analysis 128 of FIG. 1B), dictionary lookup 150, text summarization 152 (which may be the same as or substantially similar to text summarization 110 of FIG. 1A or text summarization 130 of FIG. 1B), and a generated notification 154. In some embodiments, the generated notification 154 may be summary of the unread messages 142.

In some embodiments, the system 140 utilizes the ambiguous strings model to summarize the unread messages 142 in a conversation by creating a single short message accounting for ambiguous text (e.g., the single message block 144). In some embodiments, the single message block 144 can be recorded in parallel with a chat history and used as a notification for the unread messages 142.

As an in-depth example in regard to the system 140, in some embodiments:

A) Unread messages 142 are merged into the single message block 144 (e.g., a single block of text) on a per-conversation/chat basis, and once the single message block 144 exceeds some triggering/threshold quantity of text, the main process will be initiated (e.g., topic modeling 146, sentiment analysis 148, dictionary lookup 150, and/or text summarization 152).

B) Topic modeling 146 is then used to separate and regroup topics of conversation in the unread messages 142, resulting in one or more blocks of text referencing specific topics.

C) Each of these blocks of text then pass through sentiment analysis 148 and are assigned results of the sentiment analysis 148.

D) Emojis and other text of ambiguous meaning (e.g., nonconventional characters) are replaced by dictionary lookup 150 meanings. However, unlike conventional dictionary lookup, multiple alternatives are available per string, with the sentiment associated with the text being used to create a 1:1 mapping as opposed to 1:many (e.g., due to sentiment analysis 148, dictionary lookup is able to determine a single definition associated with an emoji and does not assign multiple definitions).

E) Depending upon user preference, topic blocks of text may then be concatenated for a single summary by text summarization 152. In some embodiments, the topic blocks of text may be left separate in order to generate multiple summaries (e.g., if there are multiple topics within a single chat of the unread messages 142, there are multiple conversation from various platforms, etc.).

F) Industry standard text summarizers may used to attain a summary of the text via the text summarization 152.

G) The summarized message(s) (e.g., unread messages 142) may be used for the generated notification 154 about the chat/unread messages 154, and is presented as an 'n+1' attendee to the conversation where 'n' in the number of real attendees. It is only visible to the receiver of the unread messages 154.

As another example, the unread messages 142 may recite: First unread message: "Hi (person emoji). How are you doing? (Smile emoji) Do you want to join us for (food emoji)." Second unread message: "I will be ordering the food at 7 pm. Also can you pick it up? I have just dropped my (car emoji) off at the garage. It's broken down again!! (laughing emoji)."

The unread messages 142 may then be concatenated into the single message block 144, which may be depicted as: "Hi (person emoji). How are you doing? (Smile emoji) Do you want to join us for (food emoji). I will be ordering the food at 7 pm. Also can you pick it up? I have just dropped my (car emoji) off at the garage. It's broken down again!! (laughing emoji)." The single message block 144 may be easier for the analyses and models to ingest and utilize.

The single message block 144 may then be analyzed by the topic modeling 146 to extract topics from the unread messages 142, for instance, the first unread message may have a determined topic of food and the second unread message may have a determined topic of a car.

The single message block 144 may then be analyzed by sentiment analysis 148 to determine a likely sentiment; in some embodiments the sentiment analysis 148 may be at the same, or in parallel to the topic modeling 146. In some embodiments, the sentiment analysis 148 may determine that the sentiment of the first unread message is "joy, confidence" and that the second unread message is "displeasure, laughter".

In some embodiments, the single message block 144 is then sent to the dictionary lookup 150, which transforms the emojis into text. For example, the single message block 144, or the first and second unread messages, may now be depicted as: "Hi. How are you doing? Do you want to join us for pizza? I will be ordering the food at 7 pm. Also can you pick it up? I have just dropped my car off at the garage. It's broken down again!! Laughing through this." It is noted that in some embodiments, the dictionary lookup 150 can add correct syntax to the single message block 144/unread messages 142.

Text summarizer 152 may then summarize the single message block 144, or the unread messages 142. For instance, as depicted as "Pizza? Ordering @ 7. Can you pick up?" "Car in garage. Breakdowns annoying".

The summary from text summarizer 152 may then be used to build the generated notification 154, which may then be displayed to a receiver of the unread messages 142. It is noted that some or all of the functions of system 140 may be performed sequentially or in parallel to one another.

It is further noted that the modeling and processing depicted in FIGS. 1A-D can be associated with a step (4) disclosed above, where the modeling and processing can be generalized and applied to a number of different conversational and social media applications or contexts (single vs group chats, casual vs business conversations, chats vs web feeds, etc.) and any other source that would benefit from translating ambiguous text. This has the benefit of improving productivity with notifications from applications becoming more concise and meaningful, while overcoming ambiguity in emoji and acronym understanding.

Figure 1D:
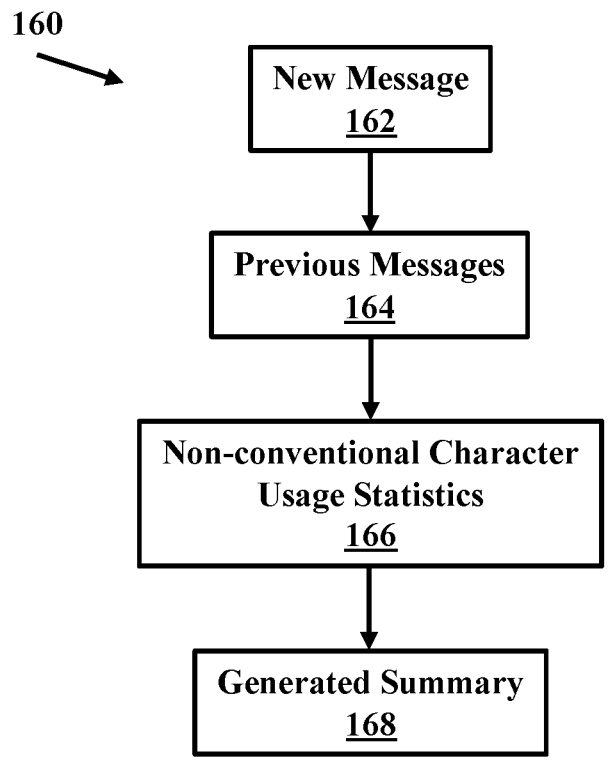
FIG. 1D illustrates a block diagram of an example system for summary generation from non-conventional character usages, in accordance with aspects of the present disclosure.

Referring now to FIG. 1D, illustrated is a block diagram of an example system 160 for summary generation from non-conventional character usages, in accordance with aspects of the present disclosure. As depicted, the system 160 includes new message 162, previous messages 164 (which may be the same as or substantially similar to the unread messages 142 of FIG. 1C), non-conventional character usage statistics 166, and a generated summary 168.

As an example, the new message 162 may recite: "Hi, are you able to pick me up from the station this evening by any chance? I still haven't picked my car up." They system 160 may then look at the previous messages 164, which again recite: First message: "Hi (person emoji). How are you doing? (Smile emoji) Do you want to join us for (food emoji)." Second message: "I will be ordering the food at 7 pm. Also can you pick it up? I have just dropped my (car emoji) off at the garage. It's broken down again!! (laughing emoji)."

The system 160 may analyze the previous messages 164 utilizing the non-conventional character usage statistics 166, which may identify emoji usage from the previous messages 164 and apply them to the new message 162. Accordingly, the system 160 may apply emojis to the new message 162 to provide the generated summary 168 to a user, where the generated summary 168 may recite: "(Person emoji) Can you pick me up from the station this evening? Still no (car emoji).

It is noted that although messages are used as an example throughout FIGS. 1A-D and throughout this disclosure, that the embodiments are not limited to just messages, and that text could be ingested from any space/source (e.g., message board, website, news blog, etc.) and not just from a messaging boundary.

Figure 2:
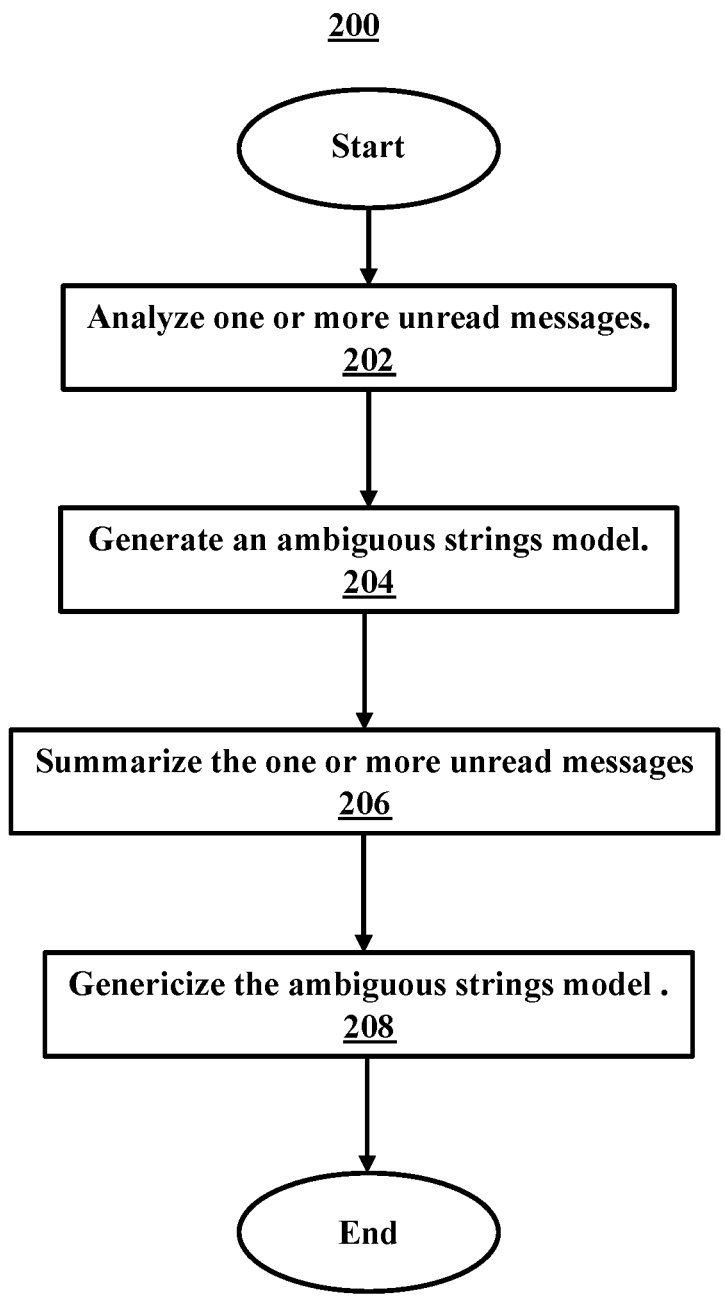
FIG. 2 illustrates a flowchart of an example method for summarization of ambiguous strings, in accordance with aspects of the present disclosure.

Referring now to FIG. 2, illustrated is a flowchart of an example method 200 for summarization of ambiguous strings, in accordance with aspects of the present disclosure. In some embodiments, the method 200 may be performed by a processor (e.g., of the system 100 of FIG. 1, etc.).

In some embodiments, the method 200 begins at operation 202 where the processor analyzes one or more unread messages. The one or more unread messages may be from one or more respective conversations.

In some embodiments, the method 200 proceeds to operation 204, where the processor generates, from the analyzing, an ambiguous strings model (e.g., which may help identify meaning of emojis, acronyms, etc.).

In some embodiments, the method 200 proceeds to operation 206, where the processor summarizes, via utilization of the ambiguous strings model, the one or more unread messages.

In some embodiments, the method 200 proceeds to operation 208, where the processor genericizes the ambiguous strings model (to be used by other platforms and/or with new messages). In some embodiments, after operation 208, the method 200 may end.

In some embodiments, discussed below, there are one or more operations of the method 200 not depicted for the sake of brevity and which are discussed throughout this disclosure. Accordingly, in some embodiments, analyzing the one or more unread messages may include separating non-sequential messages from the one or more unread messages and grouping the non-sequential messages into one or more groups based upon their content (e.g., 4 of 6 messages in a chat thread discuss a group project, and the other 2 messages discuss a location to meet, the messages could be grouped separately by their topics).

In some embodiments, summarizing the one or more unread messages may include generating a summarization message, where the summarization message is generated in parallel with a chat history that is associated with the one or more unread messages, and where the summarization message is a notification for the one or more unread messages.

In some embodiments, summarizing the one or more unread messages may include replacing all nonconventional characters within the one or more unread messages with readable text, where the readable text is based on context of the one or more unread messages.

In some embodiments, the processor may reintroduce the nonconventional characters and generate a summarization message of the one or more unread messages with the nonconventional characters. The processor may then display the summarization message to a user (e.g., receiver of unread messages for which the summarization is based on/associated with).

In some embodiments, the processor may merge each of the one or more unread messages into a single block of text on a per-conversation basis and identify that the single block of text exceeds a character limit (which triggers the processor to begin summarizing the one or more unread messages). For example, one user has 2 unread messages that total 10 words, in such a scenario, the processor may combine the messages and show all 10 words to the user. However, another user has 5 unread messages that total 100 words, in such a scenario, the processor may summarize the 5 unread messages into a 15 word summary.

In some embodiments, the processor may apply the ambiguous strings model to a media unassociated with the one or more unread messages and generate another summarization message for the media (e.g., the ambiguous strings model may be tailored to a user such that the processor understands the user's emote usage and can provide more personalized summaries; the ambiguous strings model could be trained on one platform but opted-in by the user to be used on various other platforms).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
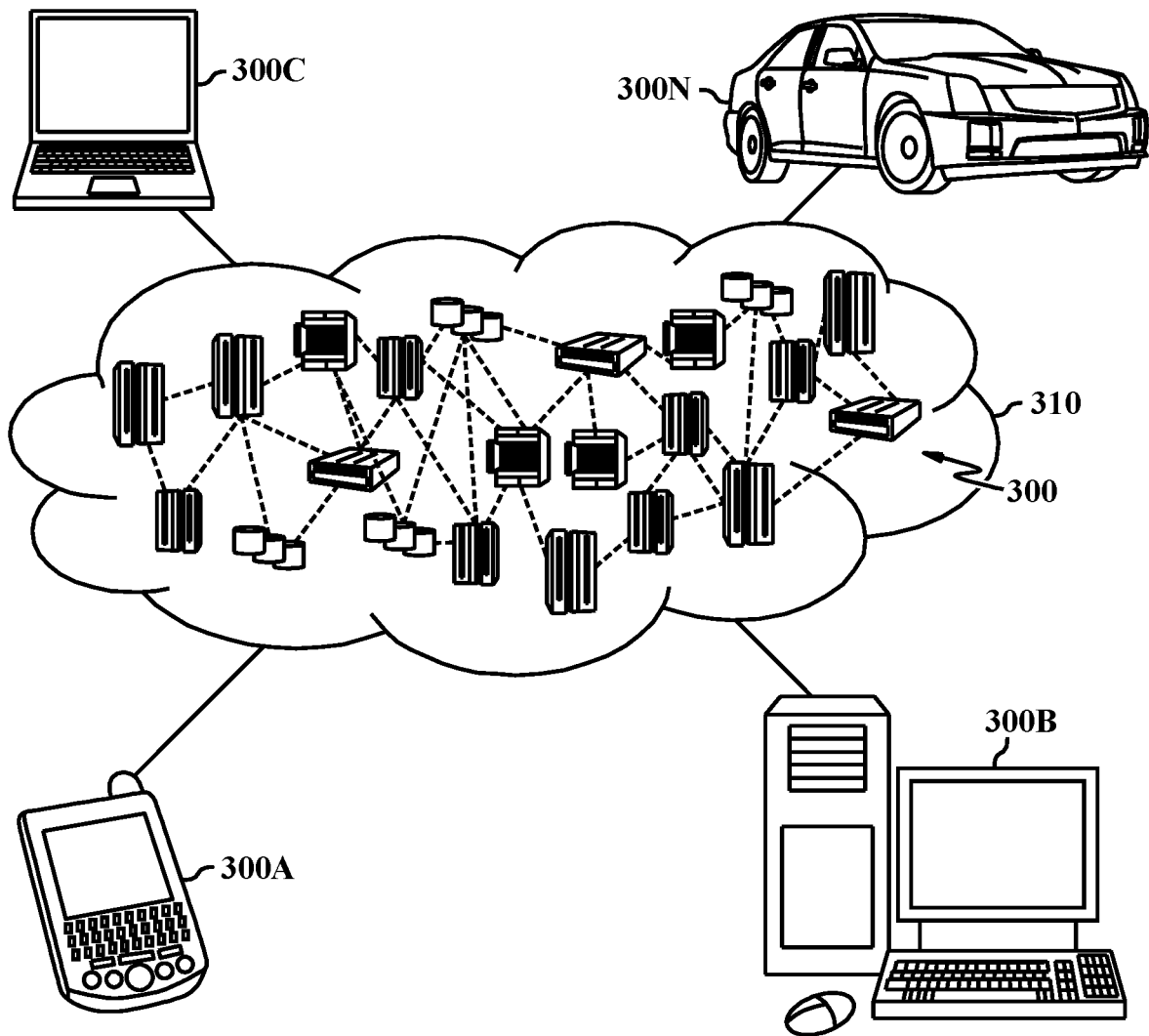
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
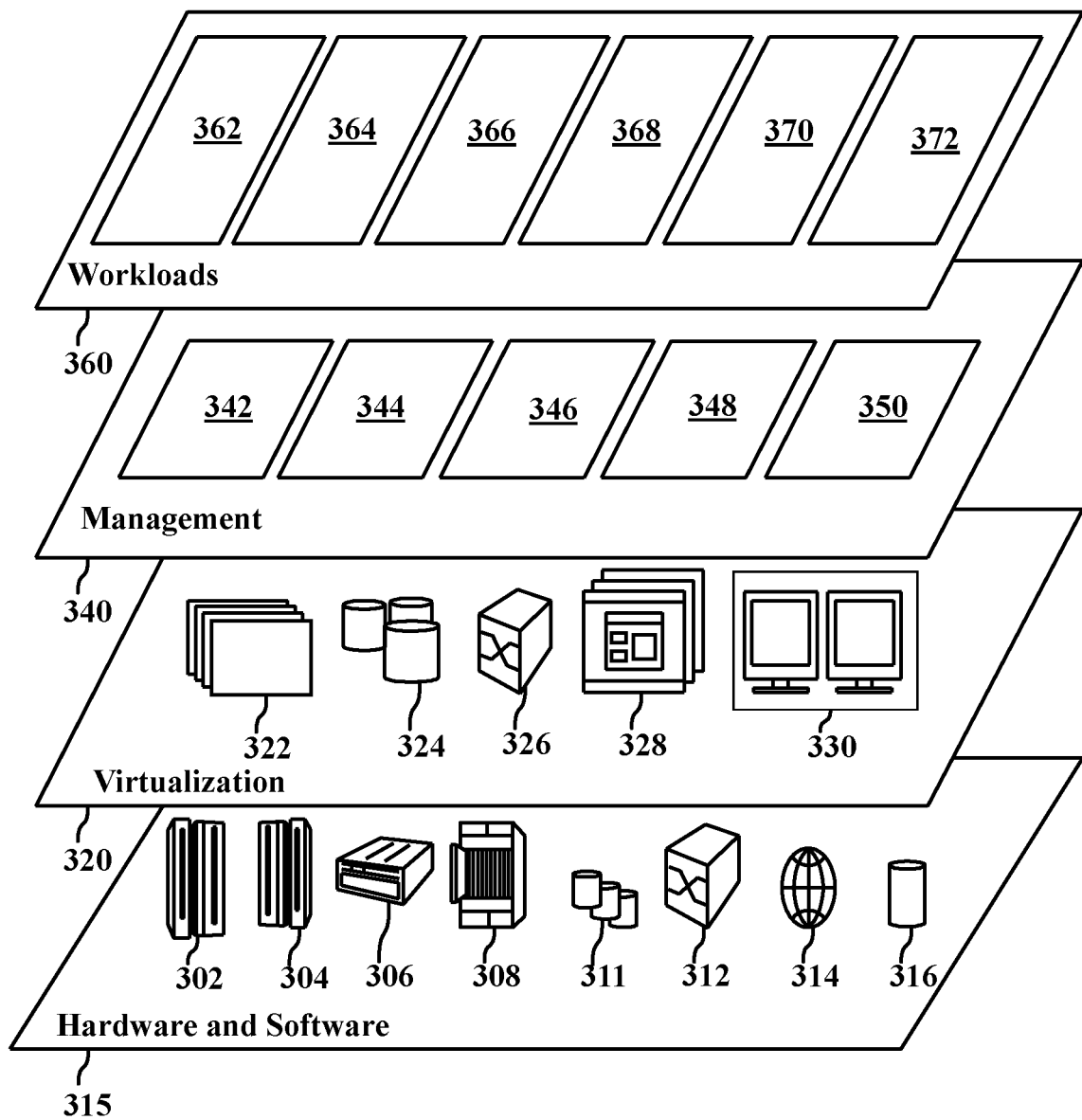
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and for summarization of ambiguous strings 372.

Figure 4:
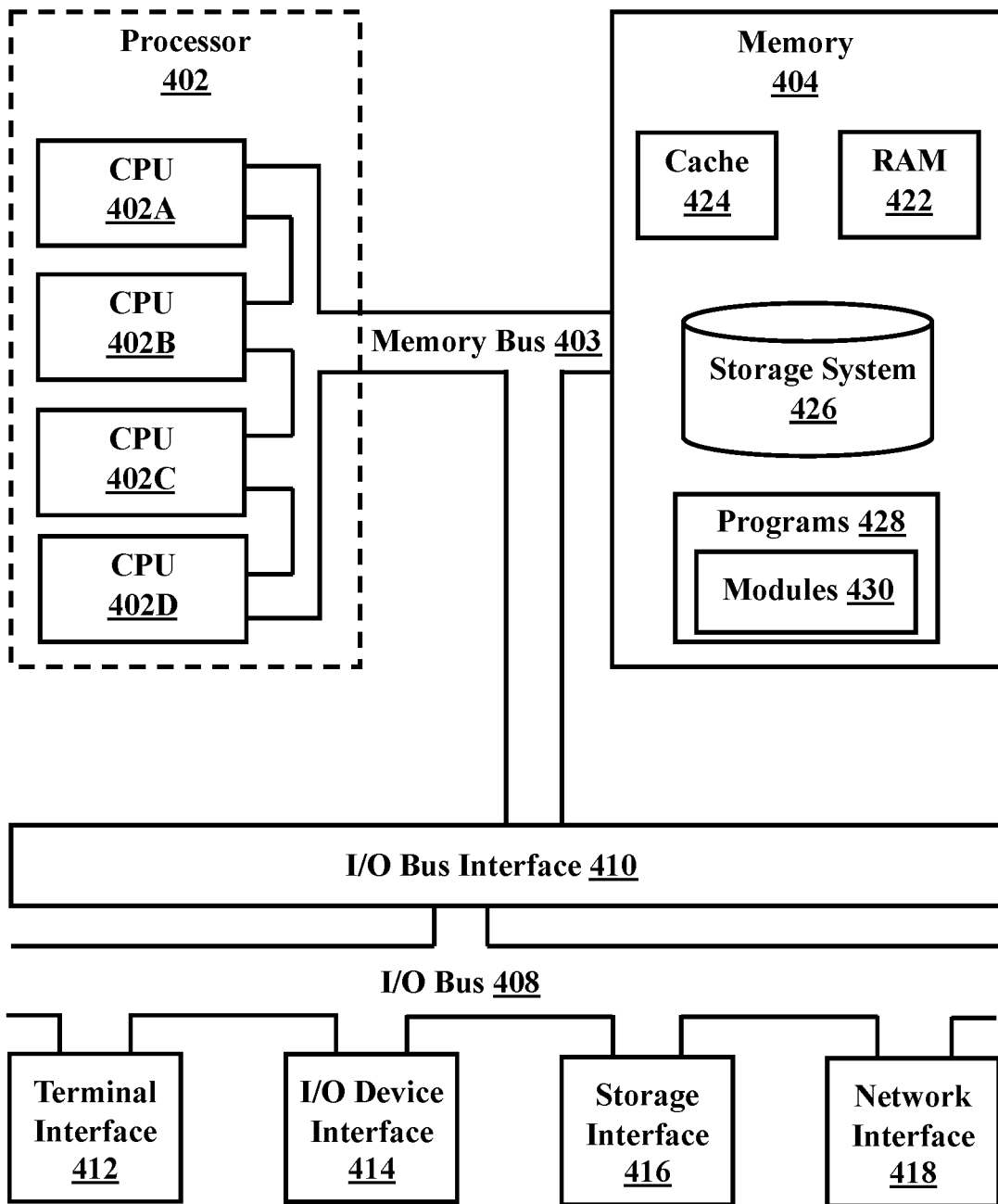
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for summarization of ambiguous strings, the system comprising:
    a memory; and
    a processor in communication with the memory, the processor being configured to perform operations comprising:
    analyzing two or more unread messages received on a cloud computing node, wherein the two or more unread messages are from one or more respective digital conversations, wherein analyzing the two or more unread messages comprises:
        separating and grouping, by a topic modeling component, topics of conversation in the two or more unread messages based on an identified content;
        identifying, by a sentiment analysis, an underlying intent of the two or more unread messages associated with the one or more respective digital conversations; and
        utilizing a linguistic analysis on the two or more unread messages from the one or more respective conversations to generate a 1:1 mapping of words/definition;
    generating, from the analyzing, an ambiguous strings model;
    summarizing, via utilization of the ambiguous strings model, the two or more unread messages from the one or more respective digital conversations by creating a single short message accounting for ambiguous text, wherein summarizing the two or more unread messages includes:
        utilizing the 1:1 mapping of words/definition to replace nonconventional characters in the two or more unread messages with a single definition associated with the nonconventional characters in the two or more unread messages; and
    genericizing the ambiguous strings model.

2. The system of claim 1, wherein analyzing the two or more unread messages includes:
    separating non-sequential messages, in relation to topics associated with the two or more unread messages; and
    grouping the non-sequential messages into one or more groups based upon their content.

3. The system of claim 1, wherein summarizing the two or more unread messages includes:
    generating a summarization message, wherein the summarization message is generated in parallel with a chat history that is associated with the two or more unread messages, and wherein the summarization message is a notification for the two or more unread messages.

4. The system of claim 1, wherein summarizing the two or more unread messages includes:
    replacing all nonconventional characters within the two or more unread messages with readable text, wherein the readable text is based on context of the two or more unread messages.

5. The system of claim 4, wherein the processor is further configured to perform operations comprising:
    reintroducing the nonconventional characters;
    generating a summarization message of the two or more unread messages; and
    displaying the summarization message to a user.

6. The system of claim 1, wherein the processor is further configured to perform operations comprising:
    merging each of the two or more unread messages into a single block of text on a per-conversation basis;
    identifying that the single block of text exceeds a character limit.

7. The system of claim 1, wherein the processor is further configured to perform operations comprising:
    applying the ambiguous strings model to a media unassociated with the two or more unread messages; and
    generating another summarization message for the media.

8. A computer-implemented method for summarization of ambiguous strings, the method comprising:
    analyzing, by a processor, two or more unread messages received on a cloud computing node, wherein the two or more unread messages are from one or more respective digital conversations, wherein analyzing the two or more unread messages comprises:
        separating and grouping, by a topic modeling component, topics of conversation in the two or more unread messages based on an identified content;
        identifying, by a sentiment analysis, an underlying intent of the two or more unread messages associated with the one or more respective digital conversations; and
        utilizing a linguistic analysis on the two or more unread messages from the one or more respective conversations to generate a 1:1 mapping of words/definition;
    generating, from the analyzing, an ambiguous strings model;
    summarizing, via utilization of the ambiguous strings model, the two or more unread messages from the one or more respective digital conversations by creating a single short message accounting for ambiguous text, wherein summarizing the two or more unread messages includes:
        utilizing the 1:1 mapping of words/definition to replace nonconventional characters in the two or more unread messages with a single definition associated with the nonconventional characters in the two or more unread messages; and
    genericizing the ambiguous strings model.

9. The method of claim 8, wherein analyzing the two or more unread messages includes:
    separating non-sequential messages, in relation to topics associated with the two or more unread messages; and
    grouping the non-sequential messages into one or more groups based upon their content.

10. The method of claim 8, wherein summarizing the two or more unread messages includes:
generating a summarization message, wherein the summarization message is generated in parallel with a chat history that is associated with the two or more unread messages, and wherein the summarization message is a notification for the two or more unread messages.

11. The method of claim 8, wherein summarizing the two or more unread messages includes:
replacing all nonconventional characters within the two or more unread messages with readable text, wherein the readable text is based on context of the two or more unread messages.

12. The method of claim 11, further comprising:
reintroducing the nonconventional characters;
generating a summarization message of the two or more unread messages; and
displaying the summarization message to a user.

13. The method of claim 8, further comprising:
merging each of the two or more unread messages into a single block of text on a per-conversation basis; and
identifying that the single block of text exceeds a character limit.

14. The method of claim 8, further comprising:
applying the ambiguous strings model to a media unassociated with the two or more unread messages; and
generating another summarization message for the media.

15. A computer program product for summarization of ambiguous strings comprising a computer readable storage medium having program instructions embodied therewith, the program instructions executable by a processor to cause the processor to perform operations, the operations comprising:
analyzing, by a processor, two or more unread messages received on a cloud computing node, wherein the two or more unread messages are from one or more respective digital conversations, wherein analyzing the two or more unread messages comprises:
separating and grouping, by a topic modeling component, topics of conversation in the two or more unread messages based on an identified content;
identifying, by a sentiment analysis, an underlying intent of the two or more unread messages associated with the one or more respective digital conversations; and
utilizing a linguistic analysis on the two or more unread messages from the one or more respective conversations to generate a 1:1 mapping of words/definition;
generating, from the analyzing, an ambiguous strings model;
summarizing, via utilization of the ambiguous strings model, the two or more unread messages from the one or more respective digital conversations by creating a single short message accounting for ambiguous text, wherein summarizing the two or more unread messages includes:
utilizing the 1:1 mapping of words/definition to replace nonconventional characters in the two or more unread messages with a single definition associated with the nonconventional characters in the two or more unread messages; and
genericizing the ambiguous strings model.

16. The computer program product of claim 15, wherein analyzing the two or more unread messages includes:
separating non-sequential messages, in relation to topics associated with the two or more unread messages; and
grouping the non-sequential messages into one or more groups based upon their content.

17. The computer program product of claim 15, wherein summarizing the two or more unread messages includes:
generating a summarization message, wherein the summarization message is generated in parallel with a chat history that is associated with the two or more unread messages, and wherein the summarization message is a notification for the two or more unread messages.

18. The computer program product of claim 15, wherein summarizing the two or more unread messages includes:
replacing all nonconventional characters within the two or more unread messages with readable text, wherein the readable text is based on context of the two or more unread messages.

19. The computer program product of claim 18, wherein the processor is further configured to perform operations comprising:
reintroducing the nonconventional characters;
generating a summarization message of the two or more unread messages; and
displaying the summarization message to a user.

20. The computer program product of claim 15, wherein the processor is further configured to perform operations comprising:
merging each of the two or more unread messages into a single block of text on a per-conversation basis; and
identifying that the single block of text exceeds a character limit.

* * * * *